US012412980B2

(12) United States Patent
Li et al.

(10) Patent No.: US 12,412,980 B2
(45) Date of Patent: Sep. 9, 2025

(54) ANTENNA AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Chunxin Li, Beijing (CN); Qianhong Wu, Beijing (CN); Jingwen Guo, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/018,921

(22) PCT Filed: Feb. 25, 2022

(86) PCT No.: PCT/CN2022/077850

§ 371 (c)(1),
(2) Date: Jan. 31, 2023

(87) PCT Pub. No.: WO2023/159457

PCT Pub. Date: Aug. 31, 2023

(65) Prior Publication Data

US 2024/0275051 A1 Aug. 15, 2024

(51) Int. Cl.
*H01Q 9/04* (2006.01)
*H01H 59/00* (2006.01)
(Continued)

(52) U.S. Cl.
CPC .......... *H01Q 9/0407* (2013.01); *H01H 59/00* (2013.01); *H01Q 1/22* (2013.01); *H01Q 1/38* (2013.01); *H01Q 21/065* (2013.01); *H01Q 23/00* (2013.01)

(58) Field of Classification Search
CPC ...... H01Q 9/0407; H01Q 1/22; H01Q 21/065; H01Q 23/00; H01H 59/00
See application file for complete search history.

(56) References Cited

U.S. PATENT DOCUMENTS 5,243,353 A * 9/1993 Nakahara ............. H01Q 9/0414 343/846
6,292,143 B1 * 9/2001 Romanofsky .......... H01Q 25/04 343/700 MS
(Continued)

FOREIGN PATENT DOCUMENTS

CN 1314689 A 9/2001
CN 101620952 A 1/2010
(Continued)

*Primary Examiner* — Hai V Tran
(74) *Attorney, Agent, or Firm* — HOUTTEMAN LAW LLC

(57) ABSTRACT

The present disclosure provides an antenna and electronic device. The antenna includes a dielectric substrate, and a first radiation patch, at least one second radiation patch and a feed unit disposed on the dielectric substrate; the feed unit is electrically connected with the first radiation patch; a switch unit is arranged between each second radiation patch and the first radiation patch; the switch unit includes a driving electrode and a membrane bridge arranged on the dielectric substrate, a bridge deck of the membrane bridge is suspended on a side, away from the dielectric substrate, of the driving electrode, and an insulating layer covers on a side, close to the bridge deck, of the driving electrode; the switch unit is configured to control whether the membrane bridge allows a current between the first radiation patch and the second radiation patch by controlling a voltage applied to the driving electrode.

20 Claims, 6 Drawing Sheets

(51) Int. Cl.

| | |
|---|---|
| ***H01Q 1/22*** | (2006.01) |
| ***H01Q 1/38*** | (2006.01) |
| ***H01Q 21/06*** | (2006.01) |
| ***H01Q 23/00*** | (2006.01) |

(56) References Cited

U.S. PATENT DOCUMENTS

| | | | | |
|---|---|---|---|---|
| 9,417,318 | B2 * | 8/2016 | Rofougaran | G06K 7/10316 |
| 2005/0178646 | A1 | 8/2005 | De Los Santos | |
| 2015/0280325 | A1 | 10/2015 | Rofougaran | |
| 2023/0155285 | A1 * | 5/2023 | Wu | H01P 1/184 343/702 |
| 2023/0369769 | A1 * | 11/2023 | Wu | H01Q 3/24 |
| 2024/0222870 | A1 * | 7/2024 | Li | H01Q 21/00 |
| 2024/0266732 | A1 * | 8/2024 | Li | H01Q 9/14 |

FOREIGN PATENT DOCUMENTS

| | | | |
|---|---|---|---|
| CN | 103401078 | A | 11/2013 |
| CN | 104022339 | A | 9/2014 |
| CN | 106067601 | A | 11/2016 |
| CN | 111201724 | A | 5/2020 |
| CN | 110611164 | B | 3/2021 |
| JP | 2004247243 | A | 9/2004 |
| TW | 572375 | U | 1/2004 |

* cited by examiner

ANTENNA AND ELECTRONIC DEVICE

TECHNICAL FIELD

The present disclosure relates to the field of communication technology, and particularly relates to an antenna and an electronic device.

BACKGROUND

With the rapid development of the information age, wireless terminals with advantages of high integration, miniaturization, multifunction, and low cost have gradually become a trend of communication technology. The performance of the antenna, which is an important part in wireless communication, directly affects the quality of information communication, and in order to meet requirements of science and technology and industrial development, the antenna is developing toward ultra-wide band, function diversification, miniaturization and intellectualization.

SUMMARY

The present disclosure is directed to at least one technical problem in the related art, and provides an antenna and an electronic device.

In a first aspect, an embodiment of the present disclosure provides an antenna, which includes a dielectric substrate, and a first radiation patch, at least one second radiation patch and a feed unit disposed on the dielectric substrate; the feed unit is electrically connected with the first radiation patch; a switch unit is arranged between each second radiation patch and the first radiation patch; the switch unit includes a driving electrode and a membrane bridge which are arranged on the dielectric substrate, a bridge deck of the membrane bridge is suspended on a side, away from the dielectric substrate, of the driving electrode, and an insulating layer is covered on a side, close to the bridge deck of the membrane bridge, of the driving electrode; the switch unit is configured to control whether or not the membrane bridge allows a current between the first radiation patch and the second radiation patch by controlling a voltage applied to the driving electrode.

In some implementations, at least one first notch is provided at an edge of the first radiation patch.

In some implementations, second radiation patches are arranged in correspondence with first notches one to one, and areas of orthographic projections of the second radiation patch and the first notch, which are arranged corresponding to each other, on the dielectric substrate are equal to each other.

In some implementations, orthographic projections of the second radiation patch and the first notch on the dielectric substrate are not overlapped.

In some implementations, the first radiation patch includes a first side edge and a second side edge each having a main body part extending in a first direction and being arranged opposite to each other in a second direction, and a third side edge and a fourth side edge each having a main body part extending in the second direction and being arranged opposite to each other in the first direction; the feed unit is connected to the first side edge, and each of the second side edge, the third side edge and the fourth side edge is correspondingly provided with the switch unit and the second radiation patch therein.

In some implementations, the first radiation patch includes a first side edge and a second side edge each having a main body part extending in a first direction and being arranged opposite to each other in a second direction; the feed unit is connected to the first side edge; a plurality of switch units and a plurality of second radiation patches are correspondingly arranged on the second side edge; in response to that one of the switch units is turned on, a current is allowed between one of the second radiation patches and the first radiation patch.

In some implementations, orthographic projections of the second radiation patches on the dielectric substrate have a same outline and a same size.

In some implementations, lengths of the second radiation patches in the first direction are equal to each other, and lengths of the second radiation patches in the second direction are monotonically increased or monotonically decreased; or, the lengths of the second radiation patches in the second direction are equal, and the lengths of the second radiation patches in the first direction are monotonically increased or monotonically decreased.

In some implementations, the membrane bridge includes the bridge deck and a first connecting arm; an end of the first connecting arm is electrically connected with the bridge deck, and another end of the first connecting arm is electrically connected with the first radiation patch or one of the second radiation patches.

In some implementations, the bridge deck includes a first end part, a second end part, and a connecting part connected between the first end part and the second end part; the first end part is connected with the first connecting arm; a width of each of the first end part and the second end part is less than a width of the connecting part.

In some implementations, the bridge deck includes a first end part, a second end part, and a connecting part connected between the first end part and the second end part; the first end part is connected with the first connecting arm; the second end part is provided with at least one first opening therein.

In some implementations, the bridge deck includes a first end part, a second end part, and a connecting part connected between the first end part and the second end part; the first end part is connected with the first connecting arm; a contact structure is arranged on a side, close to the dielectric substrate, of the second end part; in response to that the first connecting arm is electrically connected with the first radiation patch, an orthographic projection of the contact structure on the dielectric substrate is located in an orthographic projection of the second radiation patch on the dielectric substrate; in response to that the first connecting arm is electrically connected with the second radiation patch, an orthographic projection of the contact structure on the dielectric substrate is located in an orthographic projection of the first radiation patch on the dielectric substrate.

In some implementations, the bridge deck includes a first end part, a second end part, and a connecting part connected between the first end part and the second end part; the first end part is connected with the first connecting arm; in response to that the first connecting arm is electrically connected with the first radiation patch, a contact structure is arranged on a side, away from the dielectric substrate, of the second radiation patch, and an orthographic projection of the contact structure on the dielectric substrate is located in an orthographic projection of the second end part on the dielectric substrate; in response to that the first connecting arm is electrically connected with the second radiation patch, a contact structure is arranged on a side, away from the dielectric substrate, of the first radiation patch, and an orthographic projection of the contact structure on the dielectric substrate is located in an orthographic projection of the second end part on the dielectric substrate.

In some implementations, the first connecting arm is electrically connected with the first radiation patch or one of the second radiation patches through a first anchor point structure; an orthographic projection of the first anchor point structure on the dielectric substrate covers an orthographic projection of the first connecting arm on the dielectric substrate.

In some implementations, the driving electrode includes a first driving sub-electrode and a second driving sub-electrode which are arranged at intervals, and the second driving sub-electrode is closer to the second radiation patch than the first driving sub-electrode; and an isolation pillar is arranged between the first driving sub-electrode and the second driving sub-electrode.

In some implementations, the first radiation patch is provided with a second notch therein, and an orthographic projection of the feed unit on the dielectric substrate is located in an orthographic projection of the second notch on the dielectric substrate.

In some implementations, the first radiation patch, the second radiation patch and the driving electrode are arranged in a same layer and made of a same material.

In some implementations, the antenna further includes a reference electrode layer arranged on a side, away from the first radiation patch, of the dielectric substrate; and an orthographic projection of the reference electrode layer on the dielectric substrate covers orthographic projections of the first radiation patch, the second radiation patch, the feed unit and the switch unit on the dielectric substrate.

In a second aspect, an embodiment of the present disclosure provides an electronic device, which includes the antenna described above.

DETAILED DESCRIPTION

In order to make technical solutions of the present disclosure better understood, the present disclosure is further described in detail with reference to the accompanying drawings and implementations.

Unless defined otherwise, technical or scientific terms used herein shall have the ordinary meaning as understood by one of ordinary skill in the art to which the present disclosure belongs. The use of “first,” “second,” and the like in the present disclosure is not intended to indicate any order, quantity, or importance, but rather is used to distinguish one element from another. Also, the use of the terms “a,” “an,” or “the” and similar referents does not denote a limitation of quantity, but rather denotes the presence of at least one. The word “comprising/including” or “comprises/includes”, and the like, means that the element or item preceding the word contains the element or item listed after the word and its equivalent, but does not exclude other elements or items. The terms “connected” or “coupled” and the like are not restricted to physical or mechanical connections, but may include electrical connections, whether direct or indirect. Terms “upper/on”, “lower/below”, “left”, “right”, and the like are used only to indicate relative positional relationships, and if the absolute position of the object being described is changed, the relative positional relationships may be changed accordingly.

Generally, the number of radiation units may be increased to improve the performance of the antenna, but too many radiation units will cause electromagnetic interference between the units, and simultaneously, the size of the antenna will be relatively large, which is not favorable for miniaturization. The frequency reconfigurable antenna can enable the frequency of the antenna to be reconfigurable within a certain range by loading a control switch, and is characterized in that the resonance frequency of the antenna can be adjusted without increasing or reducing B radiation units of the antenna, so that the frequency reconfigurable antenna has advantages of simple structure and small occupied space. The frequency reconfiguration may be realized by generally adopting a semiconductor switch, a variable capacitance diode, liquid crystals, an MEMS (Micro-electromechanical Systems) switch and the like as a control switch, the semiconductor switch or the variable capacitance diode has significant influence on the gain and efficiency indexes of the antenna, the liquid crystal reconfigurable antenna has a relatively long response time, and compared with other switches, the MEMS switch has obvious advantages in the aspects of insertion loss, power consumption, volume, cost and the like.

Figure 1:
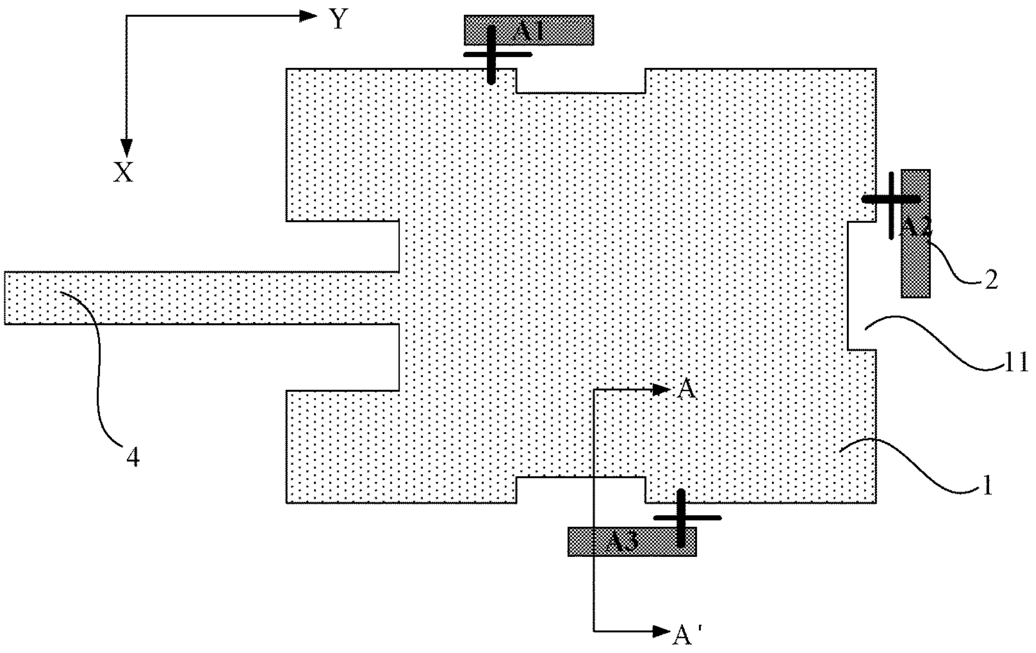
FIG. 1 is a top view of an antenna according to an embodiment of the present disclosure.
Figure 2:
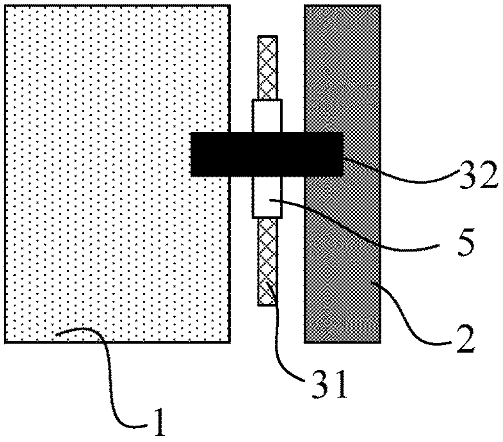
FIG. 2 is a partial enlarged view of an antenna according to an embodiment of the present disclosure.
Figure 3:
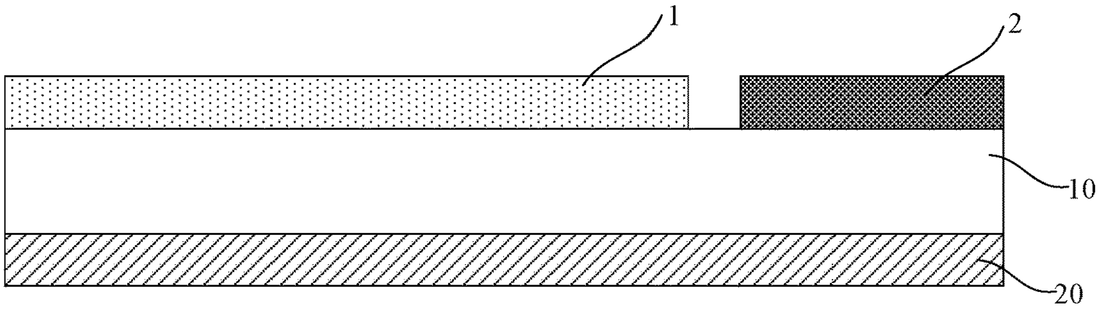
FIG. 3 is a cross-sectional view of the antenna show in FIG. 1 taken along a line A-A'.

In a first aspect, FIG. 1 is a top view of an antenna according to an embodiment of the present disclosure; FIG. 2 is a partial enlarged view of the antenna according to the embodiment of the present disclosure; FIG. 3 is a cross-sectional view of the antenna shown in FIG. 1 taken along a line A-A'; as shown in FIGS. 1 to 3, the present disclosure provides an antenna with an operating frequency being reconfigurable, and the antenna may include a dielectric substrate 10, and a first radiation patch 1, at least one second radiation patch 2, at least one switch unit 3 and a feed unit 4 disposed on the dielectric substrate 10. The feed unit 4 is electrically connected with the first radiation patch 1; the switch unit 3 is disposed corresponding to the second radiation patch 2, for example, switch units 3 are arranged in correspondence with second radiation patches 2 one to one. The switch unit 3 may include a driving electrode 31 and a membrane bridge 32 disposed on the dielectric substrate 10, a bridge deck 321 of the membrane bridge 32 is suspended on a side of the driving electrode 31 away from the dielectric substrate 10, and an insulating layer 5 is covered on a side of the driving electrode 31 close to the bridge deck 321 of the membrane bridge 32; the switch unit 3 is configured to control whether or not the membrane bridge 32 allows a current between the first radiation patch 1 and the second radiation patch 2 by controlling a voltage applied to the driving electrode 31.

For example, the membrane bridge 32 includes the bridge deck 321 and a first connecting arm 322, an end of the first connecting arm 322 is connected to the first radiation patch 1, another end of the first connecting arm 322 is connected to the bridge deck 321, a certain voltage is applied to the driving electrode 31, so that the bridge deck 321 moves toward a direction in which the driving electrode 31 is located, in such case, the bridge deck 321 is electrically connected to the second radiation patch 2, so as to achieve an electrical connection between the first radiation patch 1 and the second radiation patch 2, thereby extending a flow path of the current, and achieving a reconfiguration of operating frequency of the antenna.

It should be noted that, in the embodiment of the present disclosure, a case where the first connecting arm 322 of the membrane bridge 32 is electrically connected to the first radiation patch 1 is taken as an example, but in an actual product, the first connecting arm 322 of the membrane bridge 32 may be electrically connected to the second radiation patch 2, and operation principles of such two structures are the same, so that in the embodiment of the present disclosure, only the case where the first connecting arm 322 of the membrane bridge 32 is electrically connected to the first radiation patch 1 is taken as the example, which does not constitute a limitation to the protection scope of the present disclosure.

In some examples, as shown in FIG. 3, the antenna according to the embodiment of the present disclosure includes not only the above-mentioned structure, but also a reference electrode layer 20 disposed on a side of the dielectric substrate 10 away from the first radiation patch 1, the reference electrode layer 20 is configured to form a current loop with the first radiation patch 1 and the second radiation patch 2 during the antenna operating. The reference electrode layer 20 includes, but is not limited to, a ground electrode.

In some examples, the switch unit 3 may adopt a Micro-Electro-Mechanical System (MEMS) switch, which is a radio frequency switch and is an essential component for transmitting a radio frequency signal, and mainly controls switching of multiple circuits and transmission and interruption of signals. Several exemplary configurations of the switch unit 3 are given below.

Figure 4:
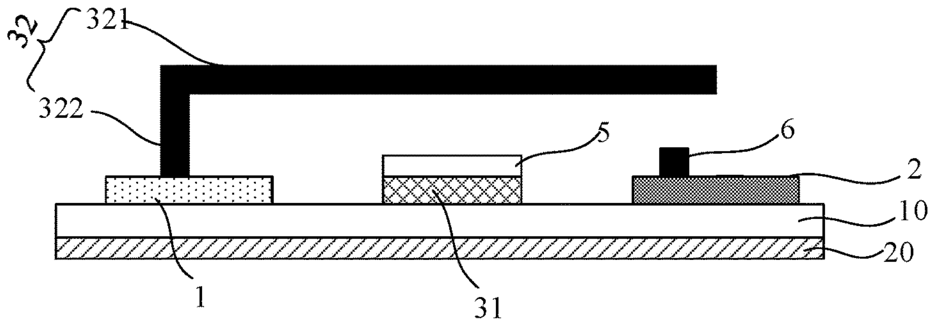
FIG. 4 is a cross-sectional view of a switch unit being turned off in a first example according to an embodiment of the present disclosure.
Figure 5:
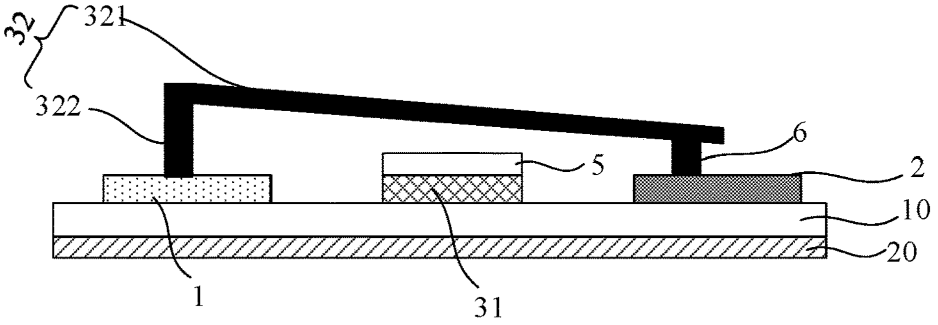
FIG. 5 is a cross-sectional view of a switch unit being turned on in a first example according to an embodiment of the present disclosure.

FIG. 4 is a cross-sectional view of the switch unit 3 being turned off in a first example according to the embodiment of the present disclosure; FIG. 5 is a cross-sectional view of the switch unit 3 being turned on in the first example according to the embodiment of the present disclosure; as shown in FIGS. 4 and 5, in the first example, the switch unit 3 includes a driving electrode 31 and a membrane bridge 32 disposed on the dielectric substrate 10. The membrane bridge 32 includes a first connecting arm 322 and a bridge deck 321, the first connecting arm 322 is connected with the bridge deck 321 to suspend the bridge deck 321 at a side of the driving electrode 31 away from the dielectric substrate 10, that is, the first connecting arm 322 and the bridge deck 321 are connected to form a cantilever beam structure. The bridge deck 321 crosses over the driving electrode 31, and an orthographic projection of the bridge deck 321 on the dielectric substrate 10 is partially overlapped with orthographic projections of the first radiation patch 1 and the second radiation patch 2 on the dielectric substrate 10. As shown in FIG. 4, in a case where the switch unit 3 is turned off, the bridge deck 321 of the membrane bridge 32 is suspended above the driving electrode 31 and the second radiation patch 2. As shown in FIG. 5, a current between the first radiation patch 1 and the second radiation patch 2 is allowed through the switch unit 3 by applying a certain driving voltage to the first radiation patch 1 and the driving electrode 31 to move the bridge deck 321 of the membrane bridge 32 toward the driving electrode 31.

In some examples, with continued reference to FIGS. 4 and 5, the bridge deck 321 of the switch unit 3 includes a first end part **321*a* and a second end part 321*b* disposed opposite to each other, and a connecting part 321*c* connected between the first end part 321*a* and the second end part 321*b*. In some implementations, the first connecting arm 322 is connected to the first end part 321*a* of the bridge deck 321. A contact structure 6 is further provided on the second radiation patch 2, and an orthographic projection of the second end part 321*b* of the bridge deck 321 on the dielectric substrate 10 covers an orthographic projection of the contact structure 6 on the dielectric substrate 10. In this case, by applying a certain voltage to the driving electrode 31 to move the bridge deck 321 to a position at which the driving electrode 31 is located, the contact structure 6 contacts the second end part 321*b* to turn on the switch unit 3, thereby electrically connecting the first radiation patch 1 with the second radiation patch 2**.

Figure 6:
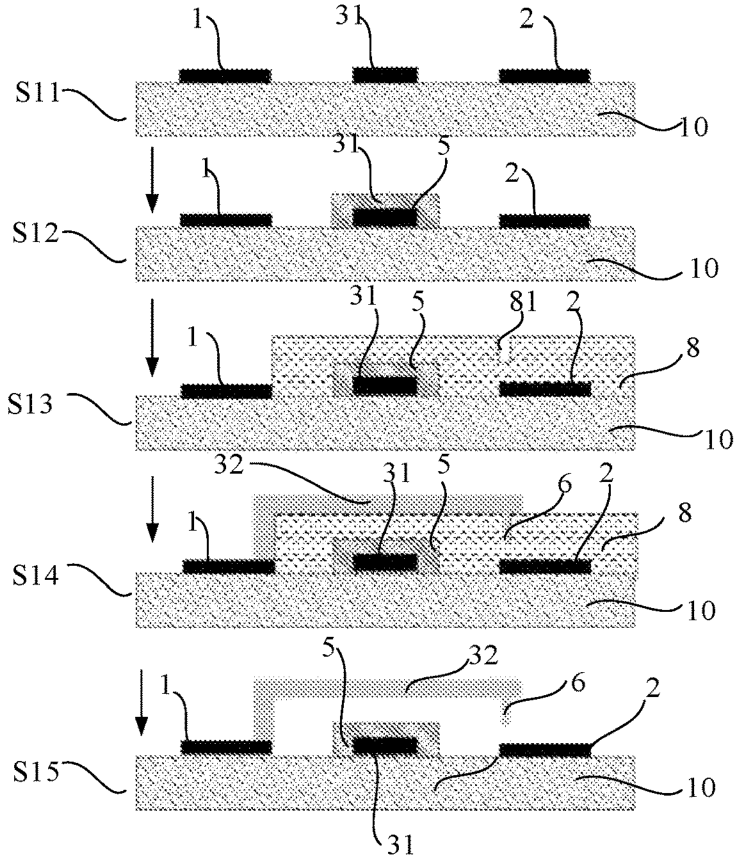
FIG. 6 is a flowchart of a method for manufacturing an antenna using a switch unit in a first example according to an embodiment of the present disclosure.

FIG. 6 is a flowchart of a method for manufacturing an antenna using the switch unit 3 in the first exemplary according to the embodiment of the present disclosure; as shown in FIG. 6, the method for manufacturing the antenna includes following steps S11 to S15.

At step S11, providing a dielectric substrate 10, and forming a pattern including a first radiation patch 1, a second radiation patch 2, and a driving electrode 31 of each switch unit 3 on the dielectric substrate 10 through a patterning process.

For example, the step S11 may include depositing a first metal layer by magnetron sputtering, and then performing exposure, development, and etching to form the pattern including the first radiation patch 1, the second radiation patch 2, and the driving electrode 31 of each switch unit 3.

At step S12, forming an insulating layer 5, covering each driving electrode 31, on the dielectric substrate 10 subjected to the step S11.

For example, in the step S12, the insulating layer 5 may be formed on a surface of the substrate through a Physical Vapor Deposition (PVD) method, a Chemical Vapor Deposition (CVD) method, or the like. In some implementations, a material of the insulating layer 5 is an inorganic insulating material. For example, the insulating layer 5 may be an inorganic insulating layer formed of silicon nitride ($SiN_x$), or an inorganic insulating layer formed of silicon oxide ($SiO_2$), or a combination film of several stacked layers including the inorganic insulating layer of $SiN_x$ and the inorganic insulating layer of $SiO_2$.

At step S13, forming a sacrificial layer 8 on the dielectric substrate 10 subjected to the step S12, and forming a first blind trench 81 in the sacrificial layer 8.

For example, a material of the sacrificial layer 8 may be an organic material, such as Polyimide (PI) and photoresist, or may be an inorganic material, such as polysilicon and phosphor-silicate glass. The sacrificial layer 8 made of the organic material may be prepared by spin coating, and a surface of the sacrificial layer 8 may be highly planarized by precisely controlling a rotation speed of a tool for spin coating and a total amount of solution to be dropped during preparing the sacrificial layer 8. The sacrificial layer 8 made of the inorganic material may be prepared by the CVD method or the PVD method, and a high planarization of an entire surface of an insulating substrate may be achieved by precisely controlling a thickness of the sacrificial layer 8 during preparing the sacrificial layer 8. The thickness of the sacrificial layer 8 may range from 0.5 microns to 5 microns. In some implementations, the first blind trench 81 is formed in the sacrificial layer 8 by etching or photolithography.

At step S14, forming a first connecting arm 322 and a bridge deck 321 of a membrane bridge 32 on the dielectric substrate 10 subjected to the step S13, and forming a contact structure 6 in the first blind trench 81.

For example, the process for forming the first connecting arm 322 and the bridge deck 321 of the membrane bridge 32, and forming the contact structure 6 in the first blind trench 81 may be the same as the process for forming the first radiation patch 1, the second radiation patch 2 and the driving electrode 31 of each switch unit 3, and thus the description thereof is not repeated here.

At step S15, removing the sacrificial layer 8 to make the bridge deck 321 to be suspended on a side of the driving electrode 31 away from the dielectric substrate 10.

For example, in the step S15, the sacrificial layer 8 may be removed by a plasma etching method or an acid-base etching method, and the method may be determined according to the material of the sacrificial layer 8.

So far, the antenna is prepared.

Figure 7:
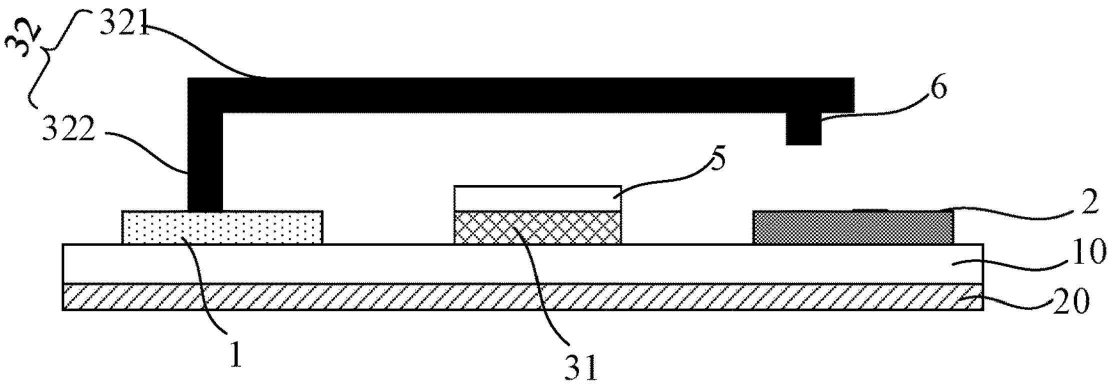
FIG. 7 is a cross-sectional view of another switch unit being turned off in a first example according to an embodiment of the present disclosure.

In some examples, FIG. 7 is a cross-sectional view of another switch unit 3 being turned off in the first example according to the embodiment of the present disclosure; as shown in FIG. 7, the contact structure 6 is disposed on a side of the second end part 321*b* of the bridge deck 321 close to the dielectric substrate 10, and an orthographic projection of the contact structure 6 on the dielectric substrate 10 is located within an orthographic projection of the second radiation patch 2 on the dielectric substrate 10. That is, in this switch unit 3, the contact structure 6 is provided on the bridge deck 321.

Figure 8:
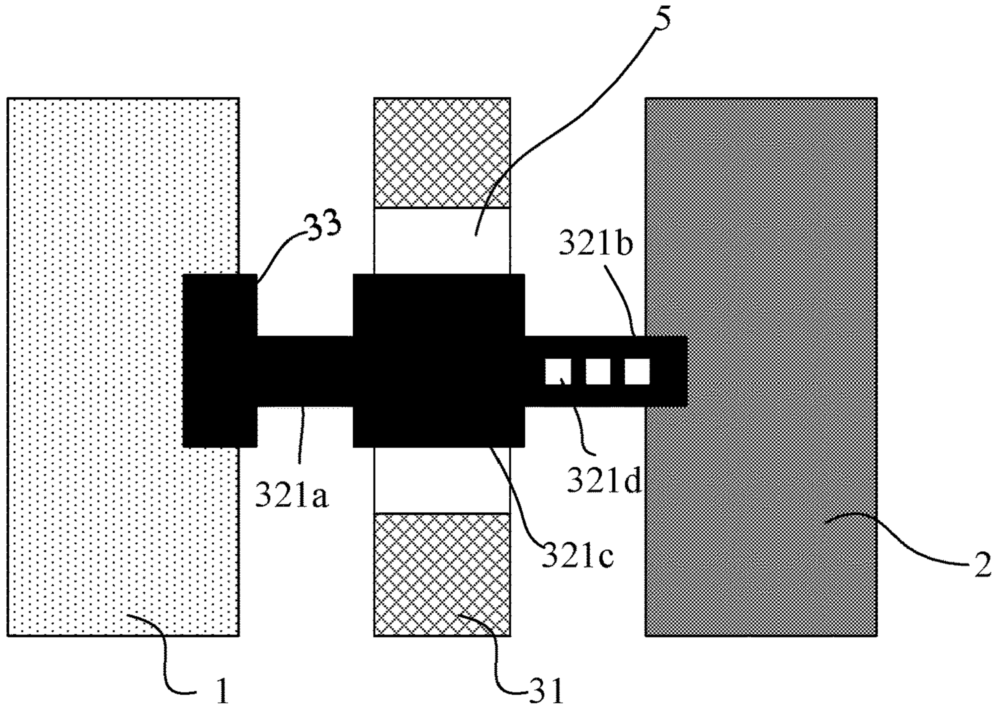
FIG. 8 is a top view of a switch unit in a second example according to an embodiment of the present disclosure.

FIG. 8 is a top view of the switch unit 3 in a second example according to the embodiment of the present disclosure; as shown in FIG. 8, in the second example, the switch unit 3 is the same as that in the first example, and includes a driving electrode 31 and a membrane bridge 32, the membrane bridge 32 includes a first connecting arm 322 and a bridge deck 321, and the bridge deck 321 includes a first end part 321*a* and a second end part 321*b* which are arranged opposite to each other, and a connecting part 321*c* connected between the first end part 321*a* and the second end part 321*b*. The second example is different form the first example in that the first connecting arm 322 and the first radiation patch 1 are electrically connected through a first anchor point structure, and an orthographic projection of the first anchor point structure on the dielectric substrate 10 covers an orthographic projection of the first connecting arm 322 on the dielectric substrate 10, that is, an area of the orthographic projection of the first anchor point structure on the dielectric substrate 10 is greater than an area of the orthographic projection of an end part of the first connecting arm 322 close to the dielectric substrate 10 on the dielectric substrate 10, which can improve stability and yield of the cantilever beam structure formed.

In some examples, with continued reference to FIG. 8, the first end part 321*a* and the second end part 321*b* of the bridge deck 321 have widths equal or substantially equal to each other, and the width of each of the first end part 321*a* and the second end part 321*b* is less than a width of the connecting part 321*c*. Note that, the width of the first end part 321*a*, the width of the second end part 321*b*, and the width of the connecting part 321*c* are respectively dimensions of the first end part 321*a*, the second end part 321*b*, and the connecting part 321*c* in a direction perpendicular to an extending direction in which the driving electrode 31 extends. In this way, an area of the bridge deck 321 directly facing the driving electrode 31 is increased, so that the driving voltage applied to the cantilever beam structure can be reduced.

In some examples, with continued reference to FIG. 8, at least one first opening 321*d* may be further disposed in the second end part 321*b* of the bridge deck 321, and the first opening 321*d* is disposed for releasing stress, and simultaneously, a weight of the cantilever beam structure can be reduced, so as to effectively improve stability and yield of the cantilever beam structure.

Figure 9:
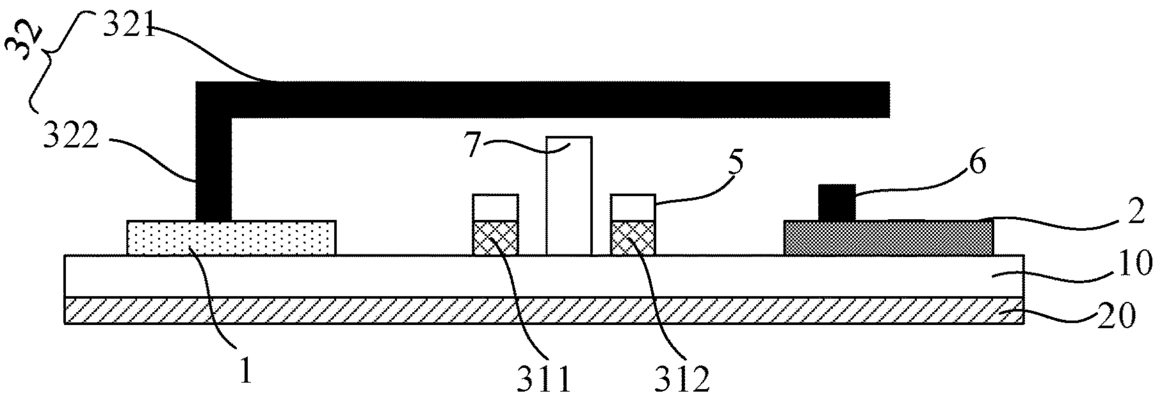
FIG. 9 is a cross-sectional view of a switch unit being turned off in a third example according to an embodiment of the present disclosure.
Figure 10:
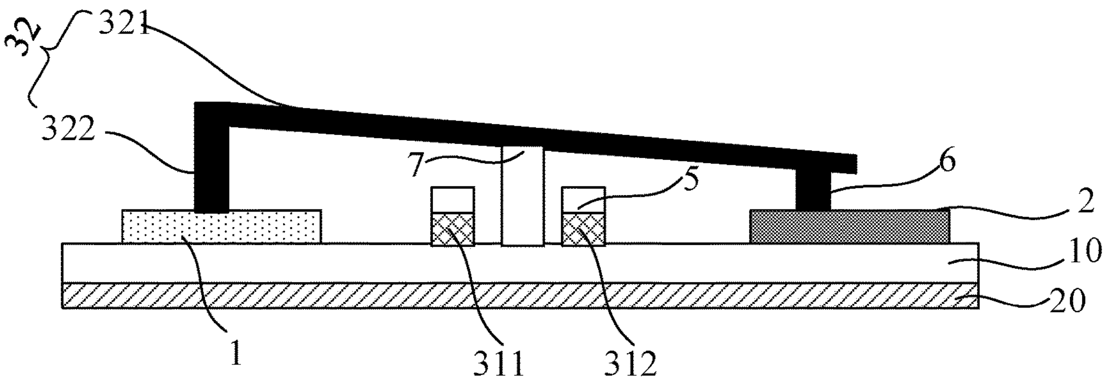
FIG. 10 is a cross-sectional view of a switch unit being turned on in a third example according to an embodiment of the present disclosure.
Figure 11:
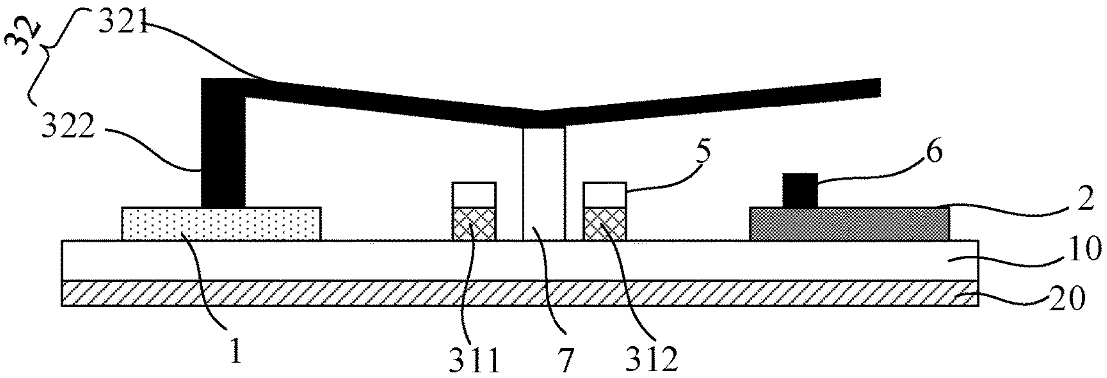
FIG. 11 is a cross-sectional view of a switch unit, failed, being modulated in a third example according to an embodiment of the present disclosure.

FIG. 9 is a cross-sectional view of the switch unit 3 being turned off in a third example according to the embodiment of the present disclosure; FIG. 10 is a cross-sectional view of the switch unit 3 being turned on in the third example according to the embodiment of the present disclosure; FIG. 11 is a cross-sectional view of the switch unit 3, failed, being modulated in the third example according to the embodiment of the present disclosure; as shown in FIGS. 9 to 11, in the third example, the switch unit 3 is the same as those in the first example and the second example, and includes a driving electrode 31 and a membrane bridge 32, the membrane bridge 32 includes a first connecting arm 322 and a bridge deck 321, and the bridge deck 321 includes a first end part 321*a* and a second end part 321*b* which are arranged opposite to each other, and a connecting part 321*c* connected between the first end part 321*a* and the second end part 321*b*. The cantilever beam structure in the switch unit 3 in the third example may adopt any one described above. The third example is different from the first example and the second example in that, the driving electrode 31 includes a first driving sub-electrode 311 and a second driving sub-electrode 312 which are arranged at an interval, the second driving sub-electrode 312 is closer to the second radiation patch 2 than the first driving sub-electrode 311, the switch unit 3 further includes an isolation pillar 7 arranged between the first driving sub-electrode 311 and the second driving sub-electrode 312, the isolation pillar 7 is spaced apart from the first driving sub-electrode 311 and the second driving sub-electrode 312, and a height (a thickness in a direction away from the dielectric substrate 10) of the isolation pillar 7 is greater than a thickness of the first driving sub-electrode 311 and a thickness of the second driving sub-electrode 312. An insulating layer 5 is arranged on surfaces of the first sub-driving electrode 311 and the second sub-driving electrode 312 away from the dielectric substrate 10. As shown in FIG. 9, when certain driving voltages are applied to the cantilever beam structure of the switch unit 3 and the driving electrode 31, the switch unit 3 is turned on. As shown in FIG. 10, if the switch unit 3 fails, after the driving voltage is removed, the cantilever beam structure of the switch unit 3 cannot return to a state in which the switch unit 3 is turned off. As shown in FIG. 11, in such case, voltages may be applied to the cantilever beam structure and the second sub-driving electrode 312, the switch unit 3 may be restored to be turned off under an electrostatic effect, so that the switch unit 3 failed may be modulated, and service life of a tunable antenna including the switch unit 3 may be effectively prolonged.

The above only gives several exemplary configurations of the switch unit 3, which do not constitute a limitation to the protection scope of the present disclosure.

In some examples, shapes of the first radiation patch 1 and the second radiation patch 2 in the antenna may be the same or different. The first radiation patch 1 and the second radiation patch 2 each may each adopt a rectangular shape, a circular shape, an elliptical shape, a regular polygonal shape, or the like. In the embodiment of the present disclosure, a case where the first radiation patch 1 and the second radiation patch 2 are rectangular patches is taken as an example for illustration, but it should be understood that the scope of the present disclosure is not limited thereto. It should be noted that the first radiation patch 1 and the second radiation patch 2 are not strictly rectangular, and in the embodiment of the present disclosure, a pattern, with four corners being right angles, and four side edges including two side edges each having a main body part extending in a first direction X and the other two side edges each having a main body part extending in a second direction Y, is referred to as a rectangle. For convenience of description, two side edges, of each of the first radiation patch 1 and the second radiation patch 2, disposed opposite to each other in the second direction Y and each extending in the first direction X are referred to as the first side edge and the second side edge; two side edges, of each of the first radiation patch 1 and the second radiation patch 2, disposed opposite to each other in the first direction X and each extending in the second direction Y are referred to as the third side edge and the fourth side edge. In some implementations, the feed unit 4 is connected to the first side edge of the first radiation patch 1. Further, at least one of the second side edge, the third side edge, and the fourth side edge of the first radiation patch 1 is correspondingly provided with the switch unit 3 and the second radiation patch 2.

In some examples, at least one first notch 11 is provided in an edge (side edge) of the first radiation patch 1. As shown in FIG. 1, an opening of the first notch 11 is away from a center of the first radiation patch 1. It should be noted that the first notch 11 refers to a notch formed in the side edge of the first radiation patch. Since the first notch 11 is formed in the edge of the first radiation patch 1, a path of current is lengthened, which is equivalent to an increase of a physical size of the antenna, so that a resonant frequency of the antenna is reduced, a purpose of miniaturization of the antenna is realized, and the antenna adopting such structure has a characteristic of low profile.

In some examples, with continued reference to FIG. 1, the feed unit 4 may be a microstrip line, and may be connected on the first side edge of the first radiation patch 1. In some implementations, the first radiation patch 1 and the microstrip line are formed into one piece, and in this way, transmission insertion loss and return loss of a microwave signal can be reduced.

In an example, in a case where the microstrip line serves as the feed unit 4, an extending direction in which the microstrip line extends penetrates through the center of the first radiation patch 1, so as to improve transmission efficiency of the microwave signal.

Further, with continued reference to FIG. 1, for impedance matching between the microstrip line and the first radiation patch 1, and reduction of insertion loss and return loss, in some implementations, a second notch 12 is formed in the side edge of the first radiation patch 1. In an example, an orthographic projection of the microstrip line on the dielectric substrate 10 is located in an orthographic projection of the second notch 12 on the dielectric substrate 10, and further, the microstrip line divides the second notch 12 into two parts with equal areas. In another example, the second notch 12 is formed in the first side edge of the first radiation patch 1, and both sides of a connection position between the microstrip line and the first radiation patch 1 are provided with the second notch 12. Such configuration can reduce the insertion loss and the return loss to maximum extent. Certainly, in some examples, the second notch 12 may also be provided at the third side edge and the fourth side edge of the first radiation patch 1.

In some examples, the antenna in the embodiment of the present disclosure may be a fractal antenna. In this case, at least one first notch 11 is provided in the first radiation patch 1, second radiation patches 2 are provided in correspondence with first notches 11 one to one, and orthographic projections of the second radiation patch 2 and the first notch 11, provided corresponding to each other, on the dielectric substrate 10 have a same shape and a same size.

In some examples, an orthographic projection of the first notch 11 on the dielectric substrate 10 is not overlapped with an orthographic projection of the second radiation patch 2 on the dielectric substrate 10, thereby avoiding coupling between the first radiation patch 1 and the second radiation patch 2.

In a case where the antenna is a fractal antenna, several examples of structures of the antenna are given below for better understanding the antenna in the embodiment of the present disclosure. In any example, the first radiation patch 1 and the second radiation patch 2 are rectangular.

Figure 12:
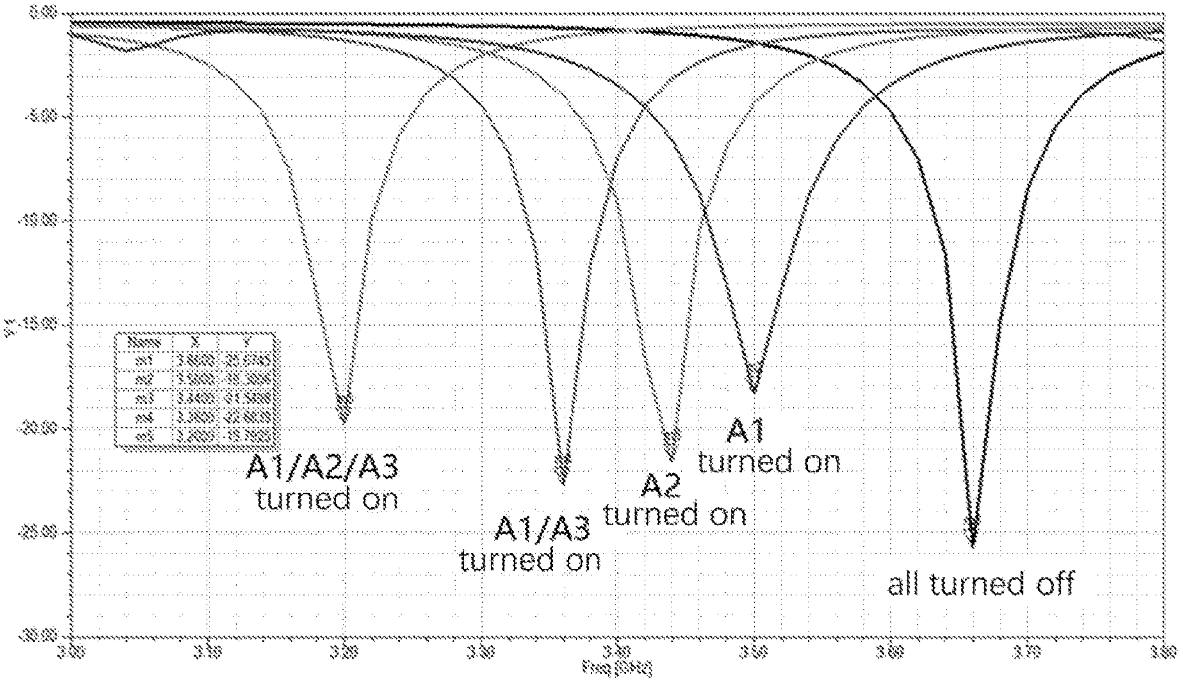
FIG. 12 is a frequency simulation diagram of an antenna in a first example.

FIG. 12 is a frequency simulation of an antenna in a first example; as shown in FIGS. 1 and 12, in the first example, each of the second side edge, the third side edge and the fourth side edge of the first radiation patch 1 of the antenna is provided with a first notch 11 being rectangular, a second radiation patch 2 being rectangular is arranged on a side, away from the first radiation patch 1, of each first notch 11, lengths of three second radiation patches 2 (A1, A2 and A3) are equal to each other, widths of the three second radiation patches 2 are equal to each other, sizes of three first notches 11 are also equal to each other, and as gradually increasing of a number of switch units 3 being turned on, an area of the second radiation patches 2 participating in radiation is also gradually increased, and a resonance of the antenna gradually shifts to left. The simulation result shows that the frequency reconfiguration can be realized by controlling states of the switch units 3, and an adjustable range of the resonant frequency is within 460 MHz.

Figure 13:
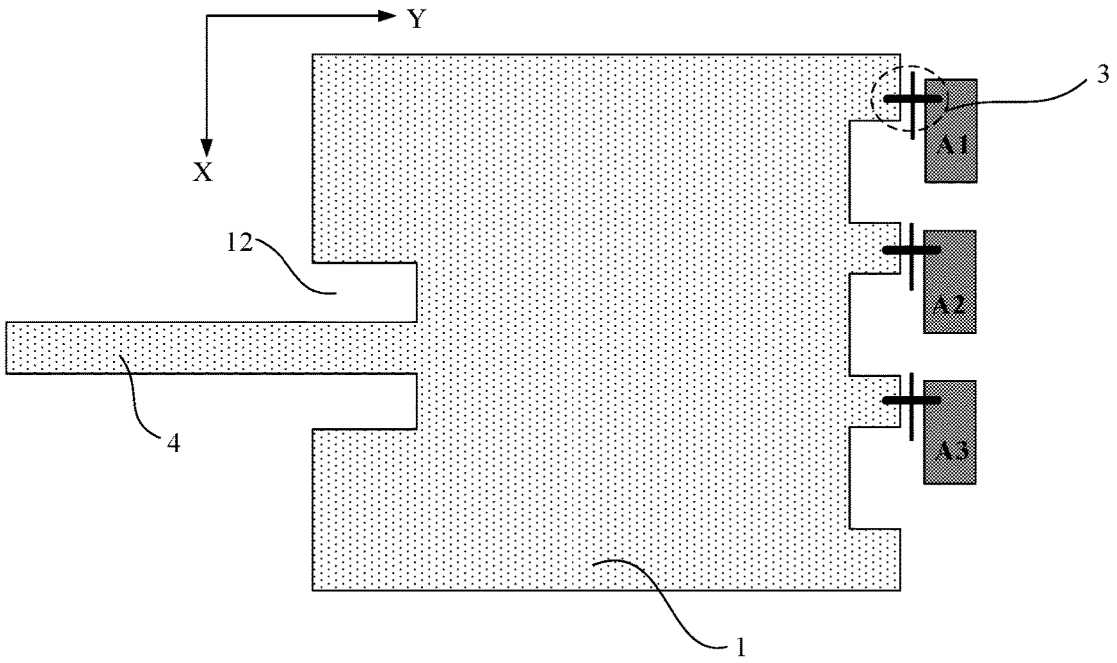
FIG. 13 is a top view of an antenna in a second example according to an embodiment of the present disclosure.
Figure 14:
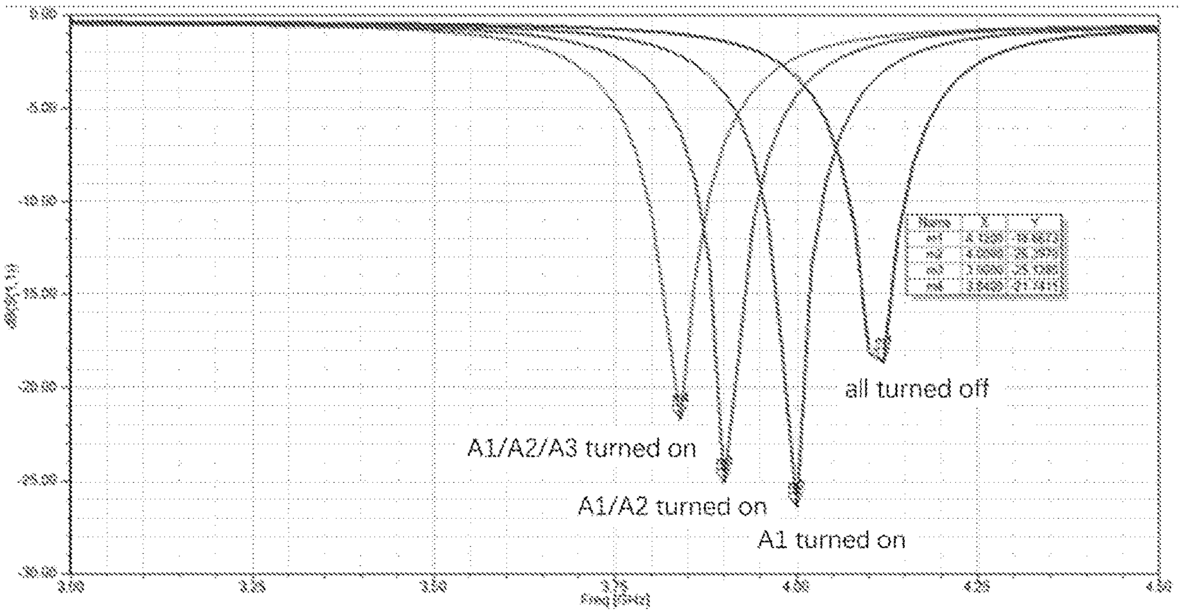
FIG. 14 is a frequency simulation diagram of an antenna in a second example.

FIG. 13 is a top view of an antenna in a second example according to the embodiment of the present disclosure; FIG. 14 is a frequency simulation diagram of the antenna in the second example; as shown in FIGS. 13 and 14, in the second example, the first radiation patch 1 of the antenna is provided with three first notches 11 each being rectangular only in the second side edge thereof, and three second radiation patches 2 (A1, A2 and A3) each being rectangular are respectively arranged on a side of the first notches 11 away from the first radiation patch 1, lengths of the three second radiation patches 2 are the same, widths of the three second radiation patches 2 are the same, sizes of the three first notches 11 are also equal to each other, and as gradually increasing of a number of switch units 3 being turned on, an area of the second radiation patches 2 participating in radiation is also gradually increased, and a resonance of the antenna gradually shifts to left. The simulation result shows that the frequency reconfiguration can be realized by controlling states of the switch units 3, and an adjustable range of the resonance frequency is within 280 MHz.

Figure 15:
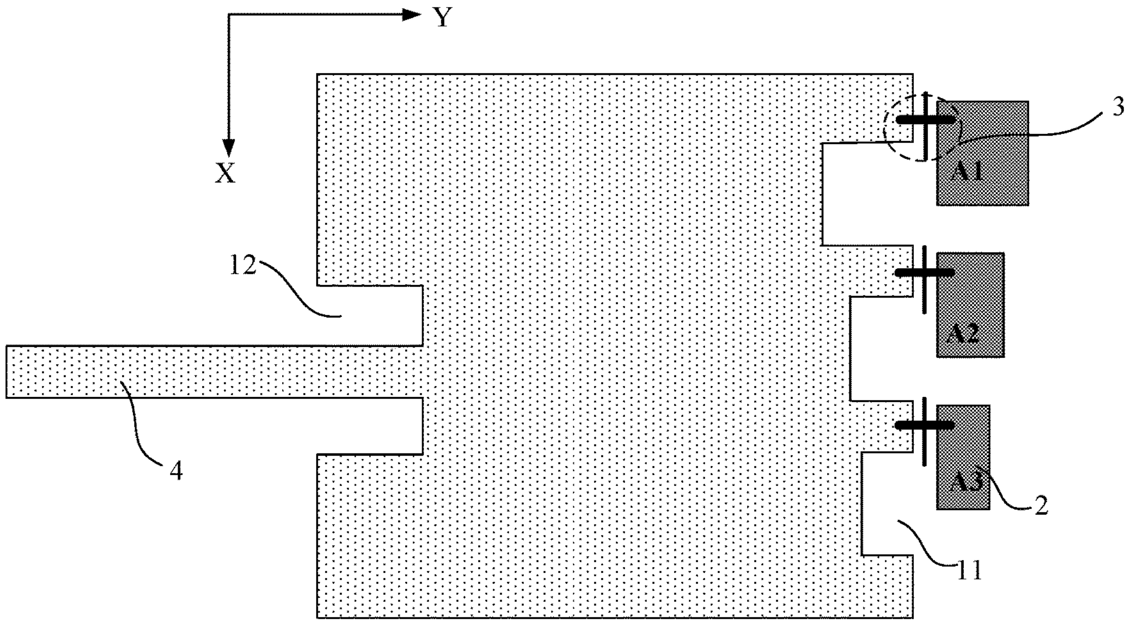
FIG. 15 is a top view of an antenna in a third example according to an embodiment of the present disclosure.
Figure 16:
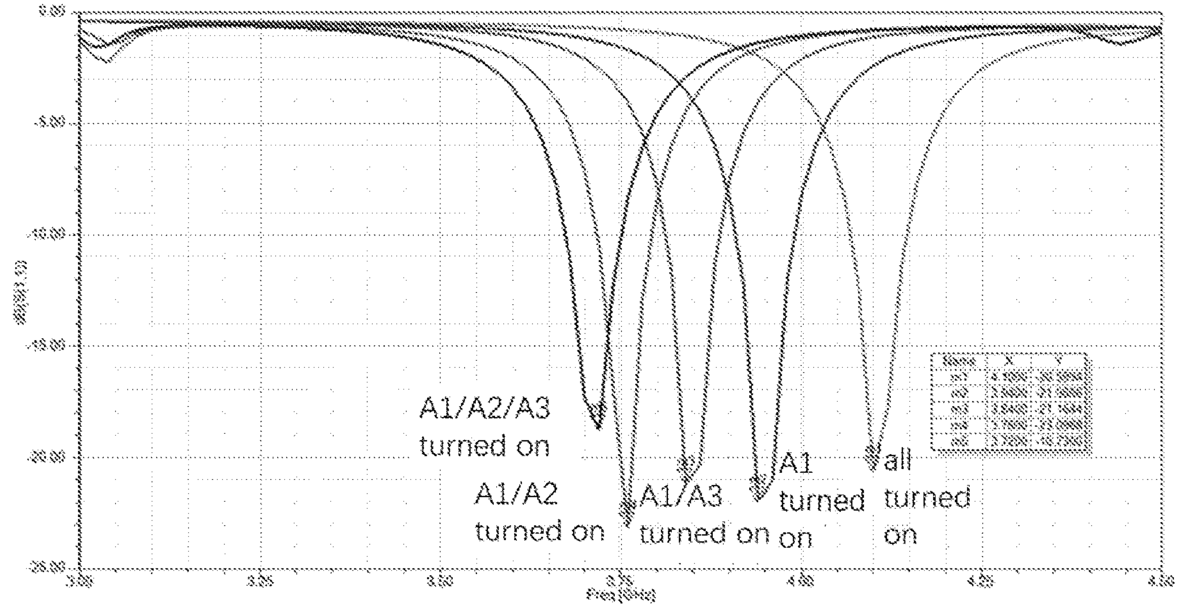
FIG. 16 is a frequency simulation diagram of an antenna in a third example.

FIG. 15 is a top view of an antenna in a third example according to the embodiment of the present disclosure; FIG. 16 is a frequency simulation diagram of the antenna in the third example; as shown in FIGS. 15 and 16, in the third example, the first radiation patch 1 of the antenna is provided with three first notches 11 being rectangular only in the second side edge, and three second radiation patches 2 (A1, A2 and A3) each being rectangular are respectively provided on a side of the first notches 11 away from the first radiation patch 1, and compared with the second example, in the third example, lengths (dimensions in the first direction X) of the three second radiation patches 2 are the same, but widths (dimensions in the second direction Y) of the three second radiation patches 2 are gradually increased from bottom to top. Orthographic projection of the three first notches 11 on the dielectric substrate 10 have the same sizes as those of the three second radiation patches 2 on the dielectric substrate 10, respectively. Such design can increase an overall perimeter of the patches, lengthening a flow path of current. As can be seen from the simulation result, as gradually increasing of a number of switch units 3 being turned on, an area of the second radiation patches 2 participating in radiation is also gradually increased, a resonance of the antenna gradually shifts to left, an adjustable range of the resonance frequency is within 380 MHz, and the adjustable range is significantly increased compared with that in the second example.

In some examples, the first radiation patch 1, the second radiation patch, the driving electrode 31 and the feed unit 4 in the antenna are arranged in a same layer and made of a same material, which helps to make the antenna light and thin; and since the first radiation patch 1, the second radiation patch 2, the driving electrode 31 and the feed unit 4 are arranged in the same layer and made of the same material, the first radiation patch 1, the second radiation patch, the driving electrode 31 and the feed unit 4 of the antenna may be formed in a single patterning process, processes can be reduced, and the production cost can be saved. In addition, thicknesses of the first radiation patch 1 and the second radiation patch 2 may be the same or different, and in the embodiment of the present disclosure, a case where the thicknesses of the first radiation patch 1 and the second radiation patch 2 are the same is taken as an example for illustration.

In some examples, the dielectric substrate 10 may be made of various materials, for example, if the dielectric substrate 10 is a flexible base, the material of the dielectric substrate 10 may include at least one of polyethylene terephthalate (PET) and Polyimide (PI), and if the dielectric layer is a rigid base, the material of the dielectric substrate 10 may be glass or the like.

In a second aspect, an embodiment of the present disclosure provides an electronic device, which includes the antenna described above.

In some examples, the electronic device provided by the embodiment of the present disclosure further includes a transceiver unit, a radio frequency transceiver, a signal amplifier, a power amplifier, and a filtering unit. The antenna in the electronic device may serve as a transmitting antenna or a receiving antenna. The transceiver unit may include a baseband and a receiving terminal, the baseband provides a signal in at least one frequency band, for example, provides a 2G signal, a 3G signal, a 4G signal, a 5G signal or the like, and sends the signal in the at least one frequency band to the radio frequency transceiver. After receiving a signal, the antenna in the electronic device may transmit the signal processed by the filtering unit, the power amplifier, the signal amplifier and the radio frequency transceiver, to the receiving terminal in the transceiver unit, and the receiving terminal may be, for example, an intelligent gateway.

Furthermore, the radio frequency transceiver is connected to the transceiver unit, and is configured to modulate the signal sent by the transceiver unit, or demodulate the signal received by the antenna and transmit the modulated signal to the transceiver unit. Specifically, the radio frequency transceiver may include a transmitting circuit, a receiving circuit, a modulating circuit and a demodulating circuit, after the transmitting circuit receives multiple types of signals provided by the baseband, the modulating circuit may modulate the multiple types of signals provided by the baseband and then send the signals to the antenna. The antenna receives signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Moreover, the radio frequency transceiver is connected with the signal amplifier and the power amplifier, the signal amplifier and the power amplifier are further connected with the filtering unit, and the filtering unit is connected with at least one antenna. In a process of sending signals by a communication system, the signal amplifier is used for improving a signal-to-noise ratio of the signals output by the radio frequency transceiver and then transmitting the signals to the filtering unit; the power amplifier is used for amplifying a power of the signals output by the radio frequency transceiver and then transmitting the signals to the filtering unit; the filtering unit includes a duplexer and a filtering circuit, combines signals output by the signal amplifier and the power amplifier, filters noise waves out and then transmits the signals to the antenna, and the antenna radiates the signals out. In a process of receiving signals by the communication system, the signals received by the antenna are transmitted to the filtering unit, noise waves are filtered and removed from the signals by the filtering unit, then the signals are transmitted to the signal amplifier and the power amplifier, the signals are gained by the signal amplifier to increase a signal-to-noise ratio of the signals, and the power amplifier amplifies a power of the signals. The signals processed by the power amplifier and the signal amplifier are transmitted to the radio frequency transceiver, and then transmitted to the transceiver unit by the radio frequency transceiver.

In some examples, the signal amplifier may include various types of signal amplifiers, such as a low noise amplifier, which is not limited here.

In some examples, the electronic device provided by the embodiment of the present disclosure further includes a power management unit connected to the power amplifier, for providing the power amplifier with a voltage for amplifying signals.

It will be understood that the above embodiments are merely exemplary embodiments adopted to illustrate the principles of the present disclosure, and the present disclosure is not limited thereto. It will be apparent to those skilled in the art that various modifications and improvements may be made without departing from the spirit and scope of the present disclosure, and such modifications and improvements are considered to be within the scope of the present disclosure.

The invention claimed is:

1. An antenna, comprising a dielectric substrate, and a first radiation patch, at least one second radiation patch and a feed unit disposed on the dielectric substrate, wherein the feed unit is electrically connected with the first radiation patch; a switch unit is arranged between each second radiation patch and the first radiation patch;

the switch unit comprises a driving electrode and a membrane bridge which are arranged on the dielectric substrate, a bridge deck of the membrane bridge is suspended on a side, away from the dielectric substrate, of the driving electrode, and an insulating layer covers on a side, close to the bridge deck of the membrane bridge, of the driving electrode; the switch unit is configured to control whether or not the membrane bridge allows a current between the first radiation patch and the second radiation patch by controlling a voltage applied to the driving electrode, wherein an edge of the first radiation patch is provided with at least one first notch therein, and wherein orthographic projections of the second radiation patch and the first notch on the dielectric substrate are not overlapped with each other.

2. The antenna of claim 1, wherein second radiation patches are disposed in correspondence with first notches one to one, and areas of orthographic projections of the second radiation patch and the first notch correspondingly disposed on the dielectric substrate are equal to each other.

3. The antenna of claim 2, wherein the first radiation patch comprises a first side edge and a second side edge each having a main body part extending in a first direction and being disposed opposite to each other in a second direction, and a third side edge and a fourth side edge each having a main body part extending in the second direction and being disposed opposite to each other in the first direction; the feed unit is connected to the first side edge, and each of the second side edge, the third side edge and the fourth side edge is correspondingly provided with the switch unit and the second radiation patch.

4. The antenna of claim 1, wherein the first radiation patch comprises a first side edge and a second side edge each having a main body part extending in a first direction and being disposed opposite to each other in a second direction, and a third side edge and a fourth side edge each having a main body part extending in the second direction and being disposed opposite to each other in the first direction; the feed unit is connected to the first side edge, and each of the second side edge, the third side edge and the fourth side edge is correspondingly provided with the switch unit and the second radiation patch.

5. The antenna of claim 1, wherein the first radiation patch comprises a first side edge and a second side edge each having a main body part extending in a first direction and being disposed opposite to each other in a second direction; the feed unit is connected to the first side edge; a plurality of switch units and a plurality of second radiation patches are correspondingly arranged on the second side edge; in response to that one of the switch units is turned on, a current is allowed between one of the second radiation patches and the first radiation patch.

6. The antenna of claim 5, wherein orthographic projections of the second radiation patches on the dielectric substrate have a same outline and a same size.

7. The antenna of claim 5, wherein lengths of the second radiation patches in the first direction are equal, and lengths of the second radiation patches in the second direction are monotonically increased or monotonically decreased; or, lengths of the second radiation patches in the second direction are equal, and lengths of the second radiation patches in the first direction are monotonically increased or monotonically decreased.

8. The antenna of claim 1, wherein the membrane bridge comprises the bridge deck and a first connecting arm; an end of the first connecting arm is electrically connected with the bridge deck, and another end of the first connecting arm is electrically connected with the first radiation patch or one of the second radiation patches.

9. The antenna of claim 8, wherein the bridge deck comprises a first end part, a second end part, and a connecting part between the first end part and the second end part; the first end part is connected with the first connecting arm; widths of the first end part and the second end part are both less than a width of the connecting part.

10. The antenna of claim 8, wherein the bridge deck comprises a first end part, a second end part, and a connecting part between the first end part and the second end part; the first end part is connected with the first connecting arm; the second end part is provided with at least one first opening therein.

11. The antenna of claim 8, wherein the bridge deck comprises a first end part, a second end part, and a connecting part between the first end part and the second end part; the first end part is connected with the first connecting arm; a contact structure is arranged on a side, close to the dielectric substrate, of the second end part;

in response to that the first connecting arm is electrically connected with the first radiation patch, an orthographic projection of the contact structure on the dielectric substrate is located in an orthographic projection of the second radiation patch on the dielectric substrate;

in response to that the first connecting arm is electrically connected with the second radiation patch, an orthographic projection of the contact structure on the dielectric substrate is located in an orthographic projection of the first radiation patch on the dielectric substrate.

12. The antenna of claim 8, wherein the bridge deck comprises a first end part, a second end part, and a connecting part between the first end part and the second end part; the first end part is connected with the first connecting arm;

in response to that the first connecting arm is electrically connected with the first radiation patch, a contact structure is arranged on a side, away from the dielectric substrate, of the second radiation patch, and an orthographic projection of the contact structure on the dielectric substrate is located in an orthographic projection of the second end part on the dielectric substrate;

in response to that the first connecting arm is electrically connected with the second radiation patch, a contact structure is arranged on a side, away from the dielectric substrate, of the first radiation patch, and an orthographic projection of the contact structure on the dielectric substrate is located in an orthographic projection of the second end part on the dielectric substrate.

13. The antenna of claim 1, wherein the first connecting arm is electrically connected to the first radiation patch or one of the second radiation patches through a first anchor point structure; an orthographic projection of the first anchor point structure on the dielectric substrate covers an orthographic projection of the first connecting arm on the dielectric substrate.

14. The antenna of claim 1, wherein the driving electrode comprises a first driving sub-electrode and a second driving sub-electrode which are arranged at intervals, and the second driving sub-electrode is closer to the second radiation patch than the first driving sub-electrode; and an isolation pillar is arranged between the first driving sub-electrode and the second driving sub-electrode.

15. The antenna of claim 1, wherein a second notch is provided in the first radiation patch, and an orthogonal projection of the feed unit on the dielectric substrate is located within an orthogonal projection of the second notch on the dielectric substrate.

16. The antenna of claim 1, wherein the first radiation patch, the second radiation patch, and the driving electrode are disposed in a same layer and are made of a same material.

17. The antenna of claim 1, further comprising a reference electrode layer disposed on a side of the dielectric substrate away from the first radiation patch; and an orthographic projection of the reference electrode layer on the dielectric substrate covers orthographic projections of the first radiation patch, the second radiation patch, the feed unit and the switch unit on the dielectric substrate.

18. An electronic device, comprising the antenna of claim 1.

19. An antenna, comprising a dielectric substrate, and a first radiation patch, at least one second radiation patch and a feed unit disposed on the dielectric substrate, wherein the feed unit is electrically connected with the first radiation patch; a switch unit is arranged between each second radiation patch and the first radiation patch;

the switch unit comprises a driving electrode and a membrane bridge which are arranged on the dielectric substrate, a bridge deck of the membrane bridge is suspended on a side, away from the dielectric substrate, of the driving electrode, and an insulating layer covers on a side, close to the bridge deck of the membrane bridge, of the driving electrode; the switch unit is configured to control whether or not the membrane bridge allows a current between the first radiation patch and the second radiation patch by controlling a voltage applied to the driving electrode, wherein the membrane bridge comprises the bridge deck and a first connecting arm; an end of the first connecting arm is electrically connected with the bridge deck, and another end of the first connecting arm is electrically connected with the first radiation patch or one of the second radiation patches, wherein the bridge deck comprises a first end part, a second end part, and a connecting part between the first end part and the second end part; the first end part is connected with the first connecting arm; the second end part is provided with at least one first opening therein.

20. An antenna, comprising a dielectric substrate, and a first radiation patch, at least one second radiation patch and a feed unit disposed on the dielectric substrate, wherein the feed unit is electrically connected with the first radiation patch; a switch unit is arranged between each second radiation patch and the first radiation patch;

the switch unit comprises a driving electrode and a membrane bridge which are arranged on the dielectric substrate, a bridge deck of the membrane bridge is suspended on a side, away from the dielectric substrate, of the driving electrode, and an insulating layer covers on a side, close to the bridge deck of the membrane bridge, of the driving electrode; the switch unit is configured to control whether or not the membrane bridge allows a current between the first radiation patch and the second radiation patch by controlling a voltage applied to the driving electrode, wherein the driving electrode comprises a first driving sub-electrode and a second driving sub-electrode which are arranged at intervals, and the second driving sub-electrode is closer to the second radiation patch than the first driving sub-electrode; and an isolation pillar is arranged between the first driving sub-electrode and the second driving sub-electrode.

* * * * *